(12) United States Patent
Choi et al.

(10) Patent No.: US 11,861,104 B2
(45) Date of Patent: Jan. 2, 2024

(54) TOUCH SENSING DEVICE HAVING GROUP CORRECTION UNIT AND DRIVING METHOD THEREOF

(71) Applicant: LX SEMICON CO., LTD., Daejeon (KR)

(72) Inventors: Jung Min Choi, Daejeon (KR); Jin Yong Kim, Daejeon (KR); Jae Hyun Cho, Daejeon (KR); Jae Duck Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/869,894

(22) Filed: Jul. 21, 2022

(65) Prior Publication Data

US 2023/0057889 A1 Feb. 23, 2023

(30) Foreign Application Priority Data

Aug. 18, 2021 (KR) .......................... 10-2021-0108428

(51) Int. Cl.
*G06F 3/041* (2006.01)
*G06F 3/044* (2006.01)

(52) U.S. Cl.
CPC ........ *G06F 3/04166* (2019.05); *G06F 3/0418* (2013.01); *G06F 3/04164* (2019.05); *G06F 3/044* (2013.01); *G06F 3/0443* (2019.05)

(58) Field of Classification Search
CPC .... G06F 3/0418; G06F 3/04164; G06F 3/044; G06F 3/0416; G06F 3/04166
See application file for complete search history.

(56) References Cited

U.S. PATENT DOCUMENTS

| 11,353,988 B1 * | 6/2022 | Chiang | G09G 3/36 |
| 11,443,546 B1 * | 9/2022 | Huang | G06F 3/04184 |
| 2015/0286339 A1 * | 10/2015 | Pyo | G06F 3/0443 345/174 |
| 2017/0139527 A1 * | 5/2017 | Nathan | G06F 3/04184 |
| 2018/0074624 A1 * | 3/2018 | Zhang | G06F 3/04166 |
| 2018/0088732 A1 * | 3/2018 | Kim | G06F 3/0418 |
| 2020/0310578 A1 * | 10/2020 | Hirai | G06F 3/0448 |

FOREIGN PATENT DOCUMENTS

| KR | 10-2013-0053668 A | 5/2013 |
| KR | 10-2016-0141414 A | 12/2016 |

* cited by examiner

*Primary Examiner* — Darlene M Ritchie
(74) *Attorney, Agent, or Firm* — ROTHWELL, FIGG, ERNST & MANBECK, P.C.

(57) ABSTRACT

A touch sensing device is connected to a plurality of touch sensors to drive the plurality of touch sensors and to receive a sensing signal. The touch sensing device includes an input unit generating pieces of sensing data by using a sensing signal input from each of the plurality of touch sensors and a correction unit dividing the pieces of sensing data into a plurality of groups and applying different correction values to the sensing data of each of the plurality of groups to generate correction data.

13 Claims, 4 Drawing Sheets

TOUCH SENSING DEVICE HAVING GROUP CORRECTION UNIT AND DRIVING METHOD THEREOF

CROSS-REFERENCE TO RELATED APPLICATIONS

This application claims the benefit of the Korean Patent Application No. 10-2021-0108428 filed on Aug. 18, 2021, which is hereby incorporated by reference as if fully set forth herein.

FIELD

The present disclosure relates to a touch sensing device and a driving method thereof.

BACKGROUND

Display apparatuses, which display an image, include liquid crystal display (LCD) apparatuses including liquid crystal, organic light emitting diode (OLED) display apparatuses including an OLED, etc.

Recently, an input method is not limited to a conventional input method such as a button, a keyboard, or a mouse, and a display apparatus (hereinafter referred to as a touch display apparatus) including a touch screen panel for sensing a touch input based on a finger of a user or a stylus pen is being widely used. The touch display apparatus described above includes a touch sensing device.

A touch display driving device for driving the touch display apparatus includes a display driving device which drives a display apparatus and a touch sensing device which detects the occurrence or not of a touch and touch coordinates (or a touch position). In detail, the touch sensing device drives touch sensors (or touch electrodes) to detect sensing data and outputs data including the occurrence or not of a touch or touch coordinates by using the detected sensing data.

SUMMARY

Accordingly, the present disclosure is directed to providing a touch sensing device and a driving method thereof that substantially obviate one or more problems due to limitations and disadvantages of the related art.

An aspect of the present disclosure is directed to providing a touch sensing device and a driving method thereof, which reduce a touch sensing defect caused by a non-uniform physical characteristic of touch sensors.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a touch sensing device connected to a plurality of touch sensors to drive the plurality of touch sensors and to receive a sensing signal, the touch sensing device including: an input unit generating pieces of sensing data by using a sensing signal input from each of the plurality of touch sensors; and a correction unit dividing the pieces of sensing data into a plurality of groups and applying different correction values to the sensing data of each of the plurality of groups to generate correction data.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
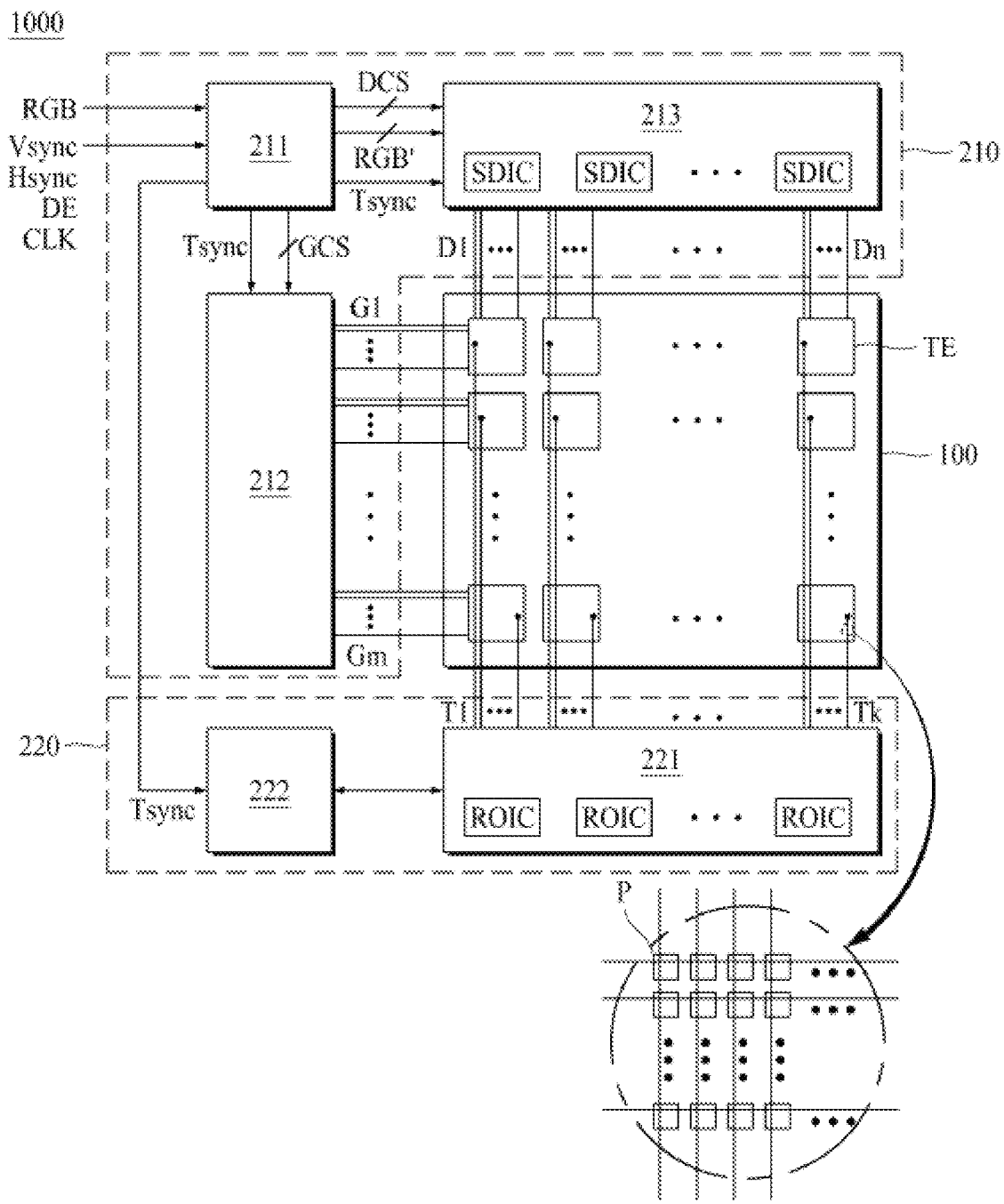
FIG. 1 is a block diagram of a touch display apparatus according to an embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only' is used. The terms of a singular form may include plural forms unless referred to the contrary.

In construing an element, the element is construed as including an error range although there is no explicit description.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a touch display apparatus according to the present disclosure will be described in detail with reference to FIGS. 1 to 4.

Figure 2:
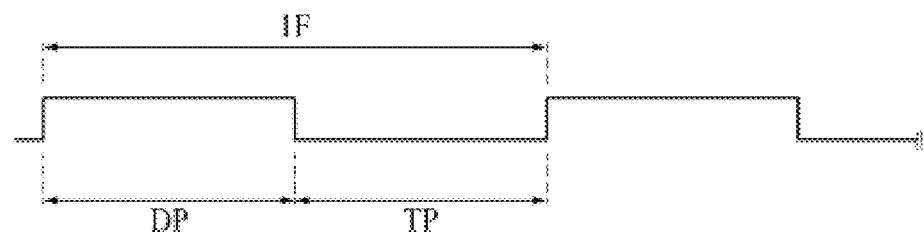
FIG. 2 is a timing diagram of a display period and a touch sensing period of a touch display apparatus.
Figure 3:
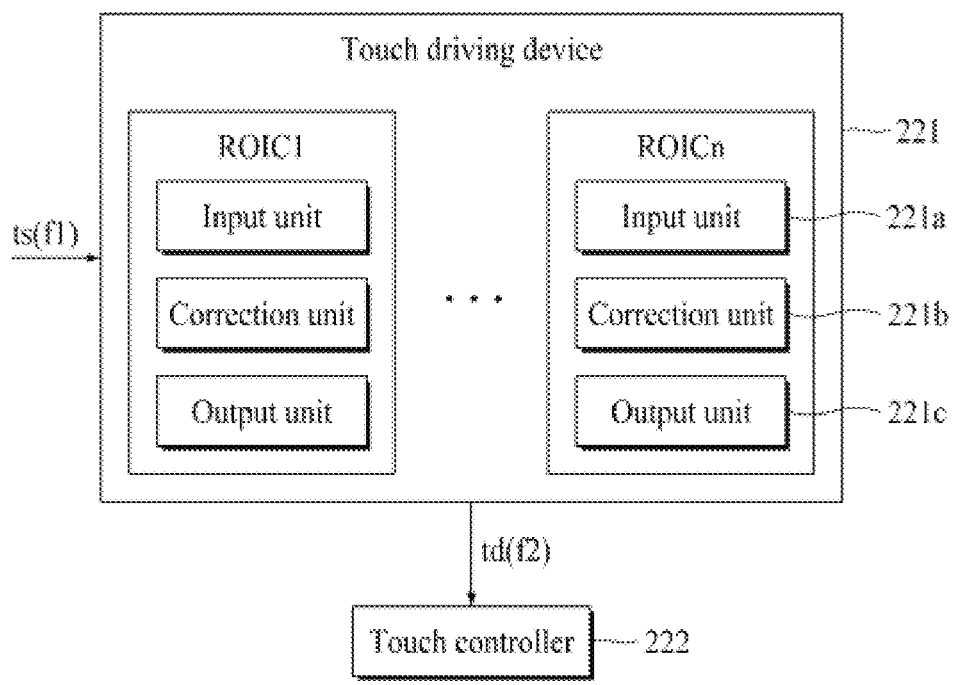
FIG. 3 is a block diagram of a touch driving device according to an embodiment of the present disclosure.
Figures 4, 5:
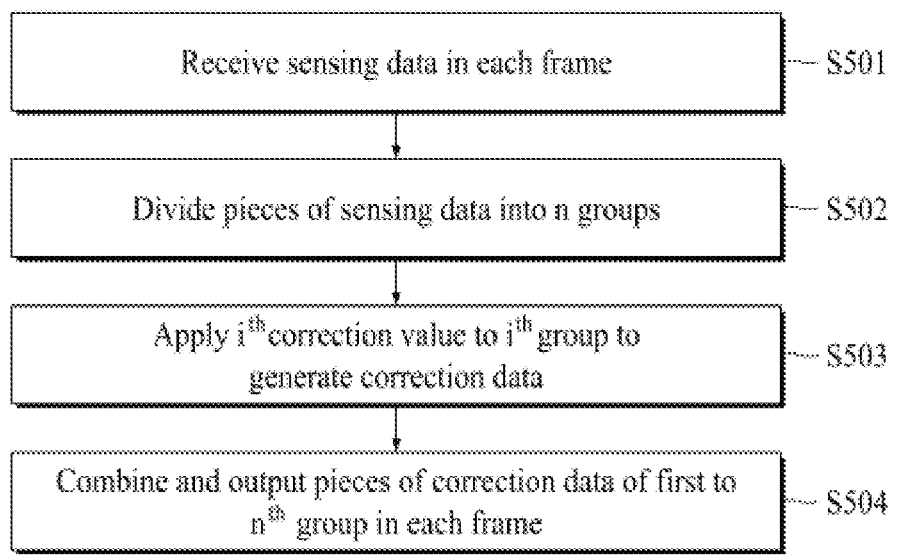
FIG. 4 is a diagram illustrating pieces of sensing data sensed by a touch driving device according to an embodiment of the present disclosure.
FIG. 5 is a flowchart of a driving method of a touch driving device according to an embodiment of the present disclosure.

FIG. 1 is a block diagram of a touch display apparatus 1000 according to an embodiment of the present disclosure, and FIG. 2 is a timing diagram of a display period and a touch sensing period of the touch display apparatus 1000. FIG. 3 is a block diagram of a touch driving device according to an embodiment of the present disclosure, and FIG. 4 is a diagram illustrating pieces of sensing data sensed by a touch driving device according to an embodiment of the present disclosure.

Referring to FIG. 1, the touch display apparatus (referred to as a display apparatus) 1000 according to an embodiment of the present disclosure may include a touch display panel 100, a display driving device 210, and a touch sensing device 220.

The display apparatus 1000 may perform a display function and a touch sensing function and may be implemented as a flat display apparatus such as a liquid crystal display (LCD) apparatus or an organic light emitting diode (OLED) display apparatus.

The touch display panel 100, as illustrated in FIG. 2, may operate in a display period DP and a touch sensing period TP. The touch display panel 100 may display an image by using light irradiated from a backlight unit during the display period DP and may perform a function of a touch panel for touch sensing during the touch sensing period TP. According to an embodiment of the present disclosure, each touch sensing period TP may denote one frame where information about touch sensing is input.

The touch display panel 100 may display an image having a certain gray level or may receive a touch. The touch display panel 100 may be an in-cell touch type display panel using a capacitance type. Alternatively, the touch display panel 100 may be an in-cell touch type display panel using a self-capacitance type or an in-cell touch type display panel using a mutual capacitance type.

The touch display panel 100 may include a plurality of gate lines G1 to Gm (where m is an integer of 2 or more), a plurality of data lines D1 to Dn (where n is an integer of 2 or more), a plurality of pixels P, a plurality of touch sensors TE, and a plurality of touch lines T1 to Tk.

Each of the plurality of gate lines G1 to Gm may receive a scan pulse in the display period DP. Each of the plurality of data lines D1 to Dn may receive a data signal in the display period DP. The plurality of gate lines G1 to Gm and the plurality of data lines D1 to Dn may be arranged on a substrate to intersect with one another, thereby defining a plurality of pixel areas. Each of the plurality of pixels P may include a thin film transistor (TFT) (not shown) connected to a gate line and a data line adjacent thereto, a pixel electrode (not shown) connected to the TFT, and a storage capacitor (not shown) connected to the pixel electrode.

Each of the plurality of touch sensors TE may perform a function of a touch electrode which senses a touch, or may perform a function of a common electrode of generating an electric field along with the pixel electrode to drive liquid crystal. That is, each of the plurality of touch sensors TE may be used as a touch electrode in the touch sensing period TP and may be used as the common electrode in the display period DP. Accordingly, each of the plurality of touch sensors TE may include a transparent conductive material.

Each of the plurality of touch sensors TE may be used as a self-capacitance type touch sensor in the touch sensing period TP, and thus, should have a size which is greater than a minimum contact size between a touch object and the touch display panel 100. Therefore, each of the plurality of touch sensors TE may have a size corresponding to one or more pixels P. The plurality of touch sensors TE may be arranged at a certain interval along a plurality of horizontal lines and a plurality of vertical lines. Each of the plurality of touch sensors TE may supply a common voltage to a corresponding touch sensor TE through a corresponding touch line of the plurality of touch lines T1 to Tk in the display period DP. The plurality of touch lines T1 to Tk may be respectively and individually connected to the plurality of touch sensors TE.

The display driving device 210 may allow a data signal to be supplied to the plurality of pixels P included in the touch display panel 100 in the display period DP, and thus, may allow the touch display panel 100 to display an image.

The display driving device 210 may include a timing controller 211, a gate driving device 212, and a data driving device 213.

The timing controller 211 may receive various timing signals including a vertical synchronization signal Vsync, a horizontal synchronization signal Hsync, a data enable signal DE, and a clock signal CLK from an external system (not shown) to generate a gate control signal GCS for controlling the gate driving device 212 and a data control signal DCS for controlling the data driving device 213. Also, the timing controller 211 may receive a video signal RGB from the external system, convert the video signal RGB into an image signal RGB' having a type capable of being processed by the data driving device 213, and output the image signal RGB'.

Moreover, the timing controller 211 may compress an external data enable signal transmitted from a host system on the basis of the display period DP to generate an internal data enable signal iDE. The timing controller 211 may generate a touch synchronization signal Tsync for temporally dividing one frame period 1F into the display period DP and the touch sensing period TP on the basis of a timing of the internal data enable signal and the vertical synchronization signal Vsync. The timing controller 211 may transfer the touch synchronization signal Tsync to the gate driving device 212, the data driving device 213, the touch driving device 221, and the touch controller 222.

The host system may convert digital video data into a format suitable for displaying corresponding video data on the display panel 100. The host system may transmit the digital video data and the timing signals to the timing controller 211. The host system may be implemented as one of a television (TV) system, a set top box, a navigation system, a DVD player, a blue player, a personal computer (PC), a home theater system, and a phone system and may receive an input video.

Moreover, the host system may receive touch input coordinates from the touch controller 222 and may execute an application program associated with the received touch input coordinates.

The gate driving device 212 may receive the gate control signal GCS from the timing controller 211 during the display period DP. The gate control signal GCS may include a gate start pulse GSP, a gate shift clock GSC, and a gate output enable signal GOE. The gate driving device 212 may generate a gate pulse (or a scan pulse) synchronized with the data signal on the basis of the received gate control signal GCS and may shift the generated gate pulse to sequentially supply the shifted gate pulse to the gate lines G1 to Gm. To this end, the gate driving device 212 may include a plurality of gate drive integrated circuits (ICs) (not shown). The gate drive ICs may sequentially supply the gate pulse synchronized with the data signal to the gate line G1 to Gm on the basis of control by the timing controller 211 during the display period DP. The gate pulse may swing between a gate high voltage VGH and a gate low voltage VGL.

The gate driving device 212 may not generate the gate pulse during the touch sensing period TP and may supply the gate low voltage VGL to the gate lines G1 to Gm. Therefore, the gate lines G1 to Gm may supply the gate pulse to the TFT of each pixel during the display period DP to sequentially select a data line, to which the data signal is to be applied, in the touch display panel 100 and may maintain the gate low voltage during the touch sensing period TP to prevent an output variation of the touch sensors.

The data driving device 213 may receive the data control signal DCS and the image signal RGB' from the timing controller 211 during the display period DP. The data control signal DCS may include a source start pulse SSP, a source sampling clock SSC, and a source output enable signal SOE. The source start pulse may control a data sampling start timing of each of n number of source drive ICs (SDIC) configuring the data driving device 213. The source sampling clock may be a clock signal which controls a sampling timing of data in each of the source drive ICs SDIC. The source output enable signal may control an output timing of each of the source drive ICs SDIC.

Moreover, the data driving device 213 may convert the received image signal RGB' into an analog data signal and may supply the analog data signal to pixels P through the plurality of data lines D1 to Dn.

The touch sensing device 220 may sense a touch through the touch sensors TE in the touch sensing period TP. In detail, the touch sensing device 220 may supply a touch driving signal to the touch sensors TE to drive the touch sensor TE, and the touch sensing device 220 may sense a variation of a capacitance which is generated when the touch sensor TE is touched.

When the touch display panel 100 is implemented as a mutual capacitance type, the readout IC ROIC may include a driving circuit, which generates the touch driving signal for driving the touch sensor TE and supplies the touch driving signal to the touch sensors TE through the touch lines T1 to Tk, and a sensing circuit which senses a capacitance variation of the touch sensors TE through the touch lines T1 to Tk to generate touch sensing data.

Alternatively, when the touch display panel 100 is implemented as a self-capacitance type, the readout IC ROIC may supply the touch driving signal to the touch sensors TE by using one circuit and may obtain the touch sensing data from the touch sensors TE.

Referring to FIGS. 1 and 3, the touch sensing device 220 may include a touch driving device 221 and a touch controller 222.

The touch driving device 221 may drive the touch sensors TE during the touch sensing period TP, and thus, may receive a touch sensing signal from the touch sensors TE. The touch driving device 221 may convert the received touch sensing signal into touch sensing data and may transfer the touch sensing data to the touch controller 222.

As illustrated in FIGS. 1 and 3, the touch driving device 221 may include a plurality of readout ICs ROIC1 to ROICn.

The readout ICs ROIC1 to ROICn may supply the common voltage to the touch sensors TE through the touch lines T1 to Tk during the display period DP. Therefore, the touch sensors TE may perform a function of the common electrode during the display period DP.

Moreover, in the above-described embodiment, it is illustrated that the source drive IC SDIC and the readout ICs ROIC1 to ROICn are implemented as separate elements, but the source drive IC SDIC and the readout ICs ROIC1 to ROICn may be implemented as a type integrated into one chip.

According to an embodiment of the present disclosure, each of the readout ICs ROIC1 to ROICn may include an input unit 221a, a correction unit 221b, and an output unit 221c.

The input unit 221a may receive a touch sensing signal ts from the touch sensor TE during the touch sensing period TP and may generate sensing data sd by using the input touch sensing signal ts. Particularly, the input unit 221a may receive the touch sensing signal ts corresponding to at least one frame in the touch sensing period TP.

Moreover, according to an embodiment of the present disclosure, the input unit 221a may receive the touch sensing signal ts on the basis of a first frequency f1 from the touch sensor TE. In this case, the first frequency f1 may have a value which differs from that of a second frequency f2 to be described below, and particularly, may have a value which is less than that of a second frequency f2. A relationship between the first frequency f1 and the second frequency f2 will be described below with reference to FIGS. 4 to 6.

The touch display panel 100 may include a first region A1 where the touch sensor TE is uniformly formed and a second region A2 where the touch sensor TE is not uniformly formed. A plurality of touch sensors TE disposed in the first region A1 may have a uniform physical characteristic and thus may transfer a uniform touch sensing signal ts to the touch sensing device, but a plurality of touch sensors TE disposed in the second region A2 may cause a sensing defect due to a non-uniform physical characteristic. For example, the first region A1 may be a center portion of the touch display panel 100, and the second region A2 may be an edge portion of the touch display panel 100.

Therefore, according to an embodiment of the present disclosure, the correction unit 221b may convert sensing data sd, corresponding to the touch sensor TE disposed in the second region A2 among pieces of sensing data sd generated in the input unit 221a, into correction data td. To this end, the correction unit 221b may classify pieces of sensing data sd corresponding to the touch sensors TE disposed in the second region A2 on the basis of a position of each of the pieces of sensing data sd and may divide the pieces of sensing data sd, classified based on a position thereof, into two or more groups.

For example, as illustrated in FIG. 4, the correction unit 221b may divide pieces of sensing data sd, disposed adjacent to one another, into groups having similar values, or may divide the pieces of sensing data sd into groups on the basis of a predetermined boundary value. For example, some of pieces of sensing data illustrated in FIG. 4 may be divided into a first group Group1 including pieces of sensing data having similar values '1244' and '1629' and a second group Group2 including pieces of sensing data having similar values '3312' and '3548'. Alternatively, some of the pieces of sensing data illustrated in FIG. 4 may be divided into the first group Group1 including the pieces of sensing data having similar values '1244' and '1629' which are less values than a middle value '2047' of sensing data and a second group Group2 including pieces of sensing data having similar values '3312' and '3548' which are greater values than the middle value '2047'.

According to an embodiment of the present disclosure, the correction unit 221b may apply different correction values to each group to generate correction data td. This will be described below in detail with reference to FIGS. 4 to 6.

Moreover, according to an embodiment of the present disclosure, the correction unit 221b may apply different correction values to different groups in each frame to generate pieces of correction data td and may combine and output the generated pieces of correction data td. Therefore, according to an embodiment of the present disclosure, pieces of sensing data sd corresponding to the touch sensors disposed in the second region A2 may be input to the input unit 221a at the first frequency f1 and may output correction data at the second frequency f2 which differs from the first frequency f1. This will be described below in detail with reference to FIGS. 4 to 6.

According to an embodiment of the present disclosure, the correction unit 221b may receive pieces of sensing data sd from the input unit 221a at the first frequency f1, output pieces of sensing data sd corresponding to the touch sensors TE disposed in the first region A1 of the touch display panel 100 at the first frequency f1, and correct and output pieces of sensing data sd corresponding to the touch sensors TE disposed in the second region A2 of the touch display panel 100 at the second frequency f2.

The output unit 221c may transfer correction data td, generated by the correction unit 221b, to the touch controller 222 at the second frequency f2.

Hereinafter, a driving method of a touch sensing device according to an embodiment of the present disclosure will be described in detail with reference to FIGS. 4 to 6.

FIG. 4 is a diagram illustrating pieces of sensing data sensed by a touch driving device according to an embodiment of the present disclosure, and FIG. 5 is a flowchart of a driving method of a touch driving device according to an embodiment of the present disclosure. FIG. 6 is a diagram illustrating a driving method of a portion of FIG. 4.

As illustrated in FIG. 4, pieces of sensing data sd may be divided into two or more groups including at least one of the pieces of sensing data sd corresponding to the touch sensors TE disposed in the second region A2 of the touch display panel 100. In detail, the pieces of sensing data sd corresponding to the touch sensors TE disposed in the second region A2 of the touch display panel 100 may be divided into the first group Group1 and the second group Group2. In this case, pieces of sensing data sd divided into one group may have similar values.

According to an embodiment of the present disclosure, as described above, the correction unit 221b may divide pieces of sensing data sd into groups and may apply different correction values to pieces of sensing data of the groups to correct the sensing data. Accordingly, the correction unit 221b may not correct each sensing data sd and may apply the same correction value to the pieces of sensing data sd of the groups corresponding to a plurality of touch sensors TE to correct the pieces of sensing data sd, and thus, a size of each of the readout ICs ROIC1 to ROICn may decrease, thereby reducing an area occupied by the readout ICs ROIC1 to ROICn.

Figure 6:
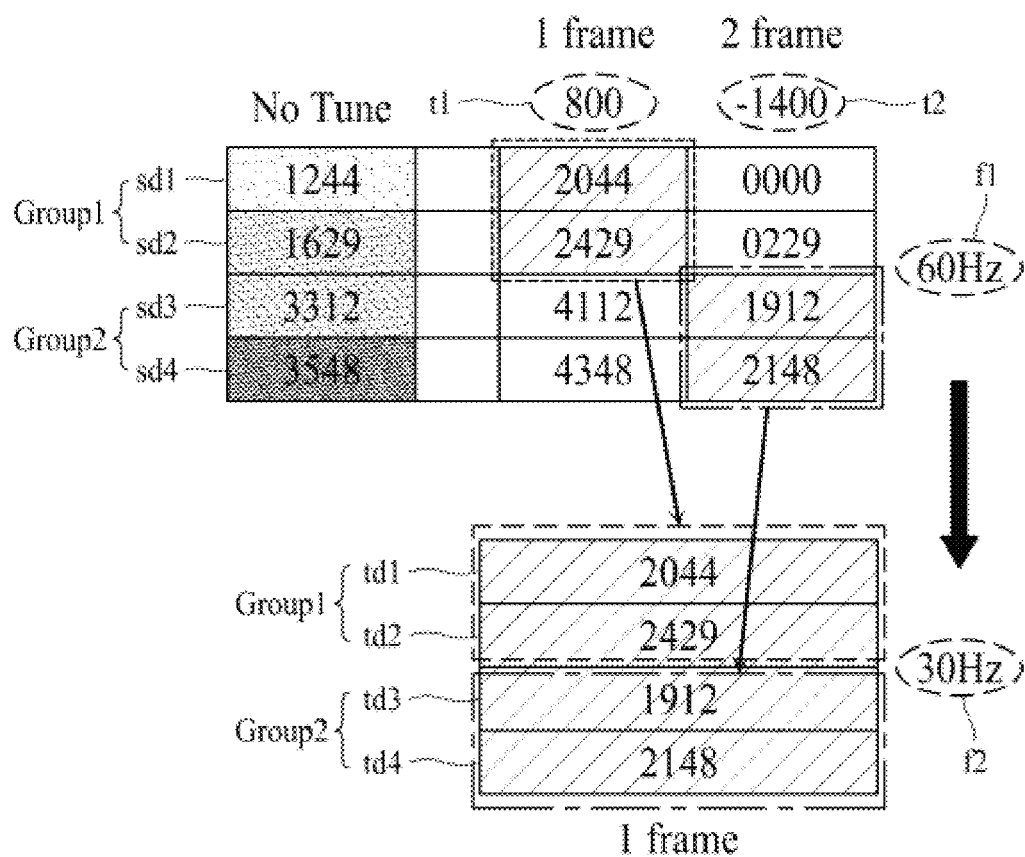
FIG. 6 is a diagram illustrating a driving method of a portion of FIG. 4.

Referring to FIGS. 5 and 6, first, the input unit 221a may receive sensing data sd in each of frames 1frame and 2frame (S501).

Subsequently, the correction unit 221b may divide pieces of sensing data into n (where n is an integer of 2 or more) number of groups (S502). For example, the correction unit 221b may divide first to fourth sensing data sd1 to sd4 into n number of groups. That is, the correction unit 221b may divide the first to fourth sensing data sd1 to sd4 into a first group Group1 and a second group Group2. In this case, the correction unit 221b may classify pieces of sensing data sd corresponding to touch sensors adjacent to one another and may divide the classified pieces of sensing data sd into groups having similar values or may divide the classified pieces of sensing data sd into groups on the basis of a predetermined boundary value. For example, as illustrated in FIG. 6, first and second sensing data sd1 and sd2 may have similar values of 1000 to 2000 and thus may configure the first group Group1, and third and fourth sensing data sd3 and sd4 may have similar values of 3000 to 4000 and thus may configure the second group Group2. Alternatively, the first and second sensing data sd1 and sd2 may have a value of 2047 or less and thus may configure the first group Group1, and the third and fourth sensing data sd3 and sd4 may have a value of more than 2047 and thus may configure the second group Group2.

Subsequently, the correction unit 221b may apply an $i^{th}$ correction value ti to an $i^{th}$ group Groupi in an i frame iframe (where i is an integer of 1 or more and n or less) to perform correction (S503). For example, the pieces of sensing data sd1 to sd4 may be divided into two (n=2) groups (the first and second groups) Group1 and Group2, may apply a first correction value t1 to each of the first and second sensing data sd1 and sd2 of the first group Group1 in 1 frame 1frame to generate first and second correction data td1 and td2, and may apply a second correction value t2 to each of the third and fourth sensing data sd3 and sd4 of the second group Group2 in 2 frame 2frame to generate third and fourth correction data td3 and td4. That is, as illustrated in FIG. 6, the correction unit 221b may add the first correction value t1 '800' to the first sensing data sd1 of the first group Group1 having a value '1244' in the 1 frame 1frame to generate first correction data td1 having a value '2044', add the first correction value t1 '800' to the second sensing data sd2 of the first group Group1 having a value '1629' to generate second correction data td2 having a value '2429', add the second correction value t2 '−1400' to the third sensing data sd3 of the second group Group2 having a value '3312' in the 2 frame 2frame to generate third correction data td1 having a value '1912', and add the second correction value t2 '−1400' to the fourth sensing data sd4 of the second group Group2 having a value '3548' to generate fourth correction data td4 having a value '2148'.

Therefore, the first and second sensing data sd1 and sd2 of the first group Group1 in the 1 frame 1frame and the third and fourth sensing data sd3 and sd4 of the second group Group2 in the 2 frame 2frame may be corrected based of different correction values, and thus, a deviation therebetween may decrease and the first and second sensing data sd1 and sd2 and the third and fourth sensing data sd3 and sd4 may be converted into the first and second correction data td1 and td2 and the third and fourth correction data td3 and td4 having similar values.

Subsequently, the correction unit 221b may combine pieces of correction data of first to $n^{th}$ groups Group1 to Groupn of the first to $n^{th}$ frames 1frame to nframe (S504). For example, as illustrated in FIG. 6, the correction unit 221b may combine the first and second correction data td1 and td2 of the first group Group1 in the 1 frame 1frame and the third and fourth correction data td3 and td4 of the second group Group2 in the 2 frame 2frame. Therefore, an after-correction frequency may allow correction data to be output at a frequency which is 1/n of a before-correction frequency. For example, the correction unit 221b may output the first to fourth correction data td1 to td4, corrected in two frames received at the first frequency f1 of 60 Hz, to the touch controller 222 at the second frequency f2 of 30 Hz.

According to an embodiment of the present disclosure, the correction unit 221b may receive pieces of sensing data from the input unit 221a at the first frequency f1, output sensing data corresponding to the first region A1 of the touch display panel 100 at the first frequency f1, and correct sensing data sd corresponding to the touch sensor TE disposed in the second region A2 of the touch display panel 100 to output the corrected sensing data at the second frequency f2 which is 1/n of the first frequency f1.

The touch sensing device and the driving method thereof according to the present disclosure may not correct each sensing data and may perform correction by applying the same correction value to pieces of sensing data of a group including a plurality of touch sensors, and thus, a size of a readout IC may be reduced, thereby decreasing an area occupied by the readout IC.

Moreover, the touch sensing device and the driving method thereof according to the present disclosure may correct sensing data to reduce a touch sensing defect caused by a non-uniform physical characteristic of touch sensors.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A touch sensing device connected to a plurality of touch sensors to drive the plurality of touch sensors and to receive a sensing signal, the touch sensing device comprising:
   an input unit generating pieces of sensing data by using a sensing signal input from each of the plurality of touch sensors; and
   a correction unit dividing the pieces of sensing data into a plurality of groups and applying different correction values to the sensing data of each of the plurality of groups to generate correction data, wherein
   the input unit receives pieces of sensing data in each of first to $n^{th}$ frames (where n is an integer of more than 1), and
   the correction unit divides the pieces of sensing data, received in each of the first to $n^{th}$ frames, into first to $n^{th}$ groups on the basis of values thereof and applies an $i^{th}$ (where i is an integer of 1 or more and n or less) correction value to pieces of sensing data configuring the $i^{th}$ group in the $i^{th}$ frame to generate correction data.

2. A touch sensing device connected to a plurality of touch sensors to drive the plurality of touch sensors and to receive a sensing signal, the touch sensing device comprising:
   an input unit generating pieces of sensing data by using a sensing signal input from each of the plurality of touch sensors; and
   a correction unit dividing the pieces data into a plurality of groups and applying different correction values to the sensing data of each of the plurality of groups to generate correction data, wherein
   the input unit receives the sensing signal at a first frequency, and
   the correction unit outputs the correction data at a second frequency which differs from the first frequency.

3. The touch sensing device of claim 1, wherein pieces of correction data generated for the first to $n^{th}$ groups in the first to n* frames are combined.

4. The touch sensing device of claim 3, wherein
   the input unit receives the sensing signal at a first frequency, and
   the correction unit combines the pieces of correction data corresponding to the first $n^{th}$ groups to output combined correction data at a second frequency which is 1/n of the first frequency.

5. The touch sensing device of claim 1, wherein the pieces of sensing data are divided into a plurality of groups on the basis of a predetermined boundary value.

6. The touch sensing device of claim 1, wherein
   the input unit receives the sensing signal at a first frequency, and
   the correction unit outputs at least some of the pieces of sensing data at a second frequency, having a value which differs from a value of the first frequency, and outputs the other of the pieces of sensing data at the first frequency.

7. The touch sensing device of claim 6, wherein the correction unit
   divides the pieces of sensing data into first to $n^{th}$ groups on the basis of values thereof,
   applies an $i^{th}$ (where i is an integer of 1 or more and n or less) correction value to pieces of sensing data configuring the $i^{th}$ group in an $i^{th}$ frame to generate correction data, and
   combines pieces of correction data of the first to $n^{th}$ groups corresponding to at least some of the pieces of sensing data to combines correction data.

8. A driving method of a touch sensing device connected to a plurality of touch sensors to drive the plurality of touch sensors and to receive a sensing signal, the driving method comprising:

generating pieces of sensing data by using a sensing signal input from each of the plurality of touch sensors, wherein the sensing signal is received at a first frequency;

dividing the pieces of sensing data into first to $n^{th}$ (where n is an integer of more than 1) groups;

applying different correction values to the sensing data of each of the first to $n^{th}$ groups to generate pieces of correction data; and combining and outputting the pieces of correction data, wherein the combined correction data is output at a second frequency which differs from the first frequency.

9. The driving method of claim 8, wherein the second frequency is 1/n of the first frequency.

10. The driving method of claim 8, wherein the dividing of the pieces of sensing data into the first to $n^{th}$ groups comprises diving the pieces of sensing data into the first to $n^{th}$ groups on the basis of values thereof.

11. The driving method of claim 10, wherein the dividing of the pieces of sensing data into the first to $n^{th}$ groups on the basis of the values comprises dividing the pieces of sensing data into a plurality of groups on the basis of a predetermined boundary value.

12. The driving method of claim 8, wherein the generating of the pieces of correction data comprises applying different correction values to at least some of the pieces of sensing data to generate the pieces of correction data.

13. The driving method of claim 12, wherein at least some of the pieces of sensing data are output at a second frequency which differs from the first frequency, and the other of the pieces of sensing data are output at the first frequency.

* * * * *